United States Patent [19]

Hoffmann et al.

[11] 4,429,029
[45] Jan. 31, 1984

[54] ORGANIC ELECTROPHOTOGRAPHIC RECORDING MEDIUM

[75] Inventors: Gerhard Hoffmann, Otterstadt; Fritz Graser; Reinhold J. Leyrer, both of Ludwigshafen, all of Fed. Rep. of Germany

[73] Assignee: BASF Aktiengesellschaft, Fed. Rep. of Germany

[21] Appl. No.: 358,581

[22] Filed: Mar. 16, 1982

[30] Foreign Application Priority Data

Mar. 20, 1981 [DE] Fed. Rep. of Germany ....... 3110960

[51] Int. Cl.³ .............................................. G03G 5/06
[52] U.S. Cl. ...................................... 430/57; 430/58; 430/72
[58] Field of Search ...................... 430/58, 57, 59, 72, 430/900; 252/500, 501.1

[56] References Cited

U.S. PATENT DOCUMENTS 1,715,430 6/1929 Schmidt et al. ...................... 546/37
3,904,407 9/1975 Regensburger et al. ............. 430/58
4,156,757 5/1979 Graser et al. ....................... 428/411

FOREIGN PATENT DOCUMENTS 2237539 7/1972 Fed. Rep. of Germany .
2139690 2/1973 Fed. Rep. of Germany .
2314051 3/1973 Fed. Rep. of Germany .
2929518 1/1980 Fed. Rep. of Germany .
3001936 7/1980 Fed. Rep. of Germany .
373844 1/1964 Switzerland .

OTHER PUBLICATIONS

Chemical Abstracts, vol. 83, No. 12, (1975), 106201v.

Primary Examiner—John D. Welsh
Attorney, Agent, or Firm—Keil & Witherspoon

[57] ABSTRACT

An electrophotographic recording medium which consists essentially of an electrically conductive base and a photosemiconductive double layer which comprises a first layer containing charge carrier-producing dyes, and a second layer containing one or more compounds which are charge carrier-transporting when exposed to light, wherein the charge carrier-producing dyes are those of the formula I

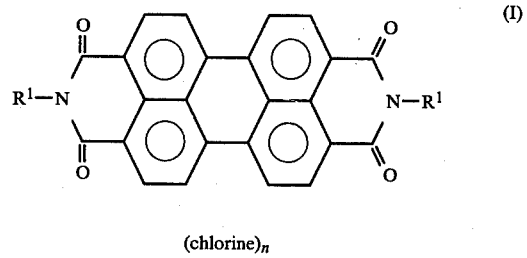

(chlorine)$_n$ or of the formula II

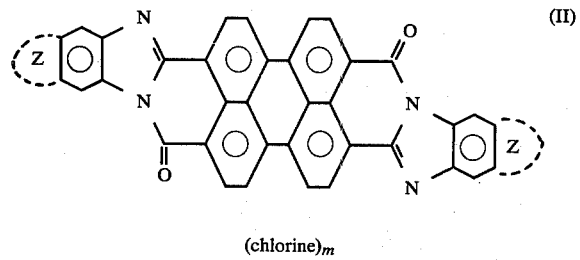

(chlorine)$_m$ where $R^1$ is hydrogen, alkyl, aralkyl, alkyl or alkylaryl, and Z may be a a fused aromatic system, and the degree to which the aromatic skeleton is halogen-substituted is from 45 to 75% of the maximum possible, and a process for the production of this electrophotographic recording medium.

5 Claims, No Drawings

ORGANIC ELECTROPHOTOGRAPHIC RECORDING MEDIUM

The present invention relates to an electrophotographic recording medium which consists of an electrically conductive base and a photosemiconductive double layer composed of organic materials, and to a process for the production of this electrophotographic recording medium.

Electrophotographic recording media comprise either one homogeneous layer of a photosemiconductor, or a plurality of layers one on top of another, on an electrically conductive base. Electrophotographic recording media with this multi-layer composite structure comprise a conductive base, a first layer containing charge carrier-producing compounds, and, in addition to this layer, a second layer containing charge carrier-transporting substances. In addition to the conventional inorganic substances, a large number of organic dyes, for example, inter alia, those derived from perylene, are described in the literature as being charge carrier-producing compounds. U.S. Pat. No. 3,904,407 describes charge carrier-producing dyes of the general formula (III)

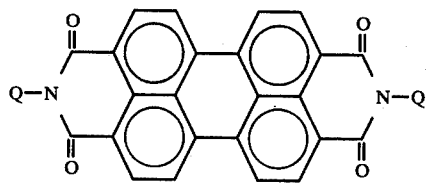

where Q may be alkyl, aryl, alkylaryl, alkoxy, halogen or a heterocyclic radical, in particular a p-chlorophenyl or p-methoxyphenyl radical. Electrophotographic elements of similar structure are disclosed in German Laid-Open Application DOS 2,237,539, the first layer containing dyes of the general formula (IV)

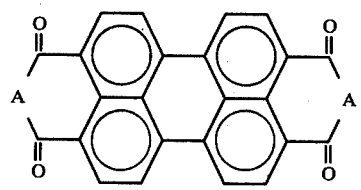

as charge carrier-producing compounds. In this formula, A may be oxygen or N—R, where R is hydrogen, $C_1$-$C_4$-alkyl, an unsubstituted or substituted aryl, aralkyl or heterocyclic radical, or —NHR' where R' is unsubstituted or substituted phenyl or benzoyl. Preferred compounds of this type are perylene-3,4,9,10-tetracarboxylic acid dianhydride, perylene-3,4,9,10-tetracarboxylic acid diimide and perylene-3,4,9,10-tetracarboxylic N,N'-dimethyldiimide.

The use of other perylene derivatives of the general formula (V)

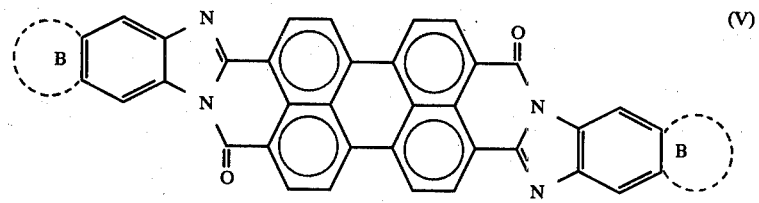

where B is a fused aromatic system is described in German Laid-Open Application DOS No. 2,314,051.

All dyes of the general formulae (III), (IV) and (V) may be employed as charge carrier-producing compounds in multi-layer electrophotographic recording media, but they possess inadequate photosensitivity for present-day requirements. In addition, some of these dyes do not exhibit particularly pronounced panchromatic characteristics, ie. the uniformly good production of charge carriers over the whole visible spectrum.

It is an object of the present invention to provide a very photosensitive recording medium which may be prepared very simply from a dye dispersion, possesses improved electrophotographic properties and has substantially panchromatic absorption characteristics, in order to be able to obtain good copies of colored originals, and utilize all the light from the lamps in conventional copying machines, the said recording medium having a composite structure and comprising (a) an electrically conductive base,
(b) a first layer, from 0.005 to 5 μm thick, which contains charge carrier-producing dyes of a particular type, and
(c) a second layer which may be from 2 to 40 μm thick, is substantially transparent to actinic light and is composed of insulating organic materials containing one or more compounds which are charge carrier-transporting when exposed to light, with or without other active or inactive organic materials or binders which assist rather than hinder the transport of charge carriers.

We have found, surprisingly, that this object is achieved by means of dyes of the general formula (I)

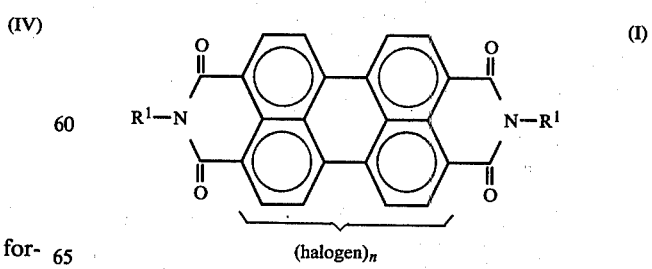

where $R^1$ is hydrogen, alkyl, aralkyl, aryl or alkylaryl, or those of the formula II

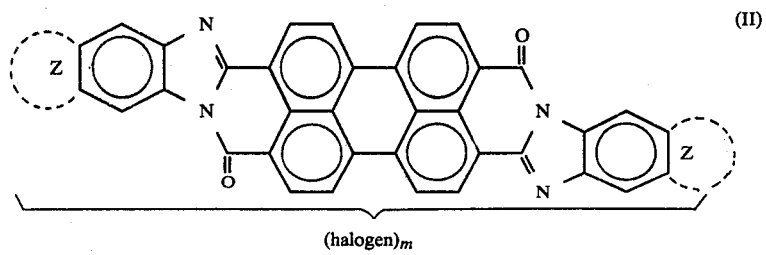

(II)

(halogen)$_m$ where Z may be a fused aromatic system, when the aromatic skeleton is halogenated, ie. hydrogen is replaced by halogen, substitution by chlorine being preferred for reasons of ease of preparation alone.

It is particularly surprising that very good electrophotographic properties are found when the degree to which the aromatic skeleton is halogen-substituted is about 45–75%, preferably 50–70%, of the maximum substitution. Thus, dyes of the general formula (I) may be substituted in the perylene skeleton by a maximum of 8 halogen atoms (n=8), corresponding to a halogen substitution of 100%. In dyes of the general formula (II), the number m of halogen atoms required for 100% halogen substitution depends on Z, ie. on the other fused aromatic systems. If Z is absent, 100% substitution is obtained by introducing 16 halogen atoms.

In the particularly preferred dyes having a halogen substitution of 45–75%, $3.6 \leq n \leq 6$ for those of type (I), and $7.2 \leq m \leq 12$ for those of type (II) (without Z). These values change when Z, ie. another fused, aromatic system, is present.

In practice, halogenation of an aromatic compound of this type always gives a mixture of compounds containing different numbers of halogen atoms. The prior art halogenation is carried out in such a manner that a mixture of compounds containing $(x \pm 1)$ halogen atoms is obtained, x representing n and m and being in the particular desired range. In practice, odd numbers are found for n and m in the halogen determination, owing to a non-uniform distribution.

Compounds of the general formulae (I) or (II) which have a degree of halogen substitution outside the range according to the invention, or which do not contain halogen (corresponding to the compounds of the general formulae (III), (IV) and (V)), do not possess the surprisingly good electrophotographic properties, and compounds of the general formulae (I) and (II) which have a degree of substitution of 100% have especially poor properties.

According to the invention, the general formula (II) represents the isomer mixture comprising the symmetrical form and the asymmetrical form, ie. fusion of the benzimidazole rings asymmetrically with respect to the two-fold axis of rotation of the molecule.

To prepare the novel electrophotographic recording medium, a dispersion of the dyes which are suitable according to the invention, in an organic, readily volatile solvent, together with a binder which is conventionally used for this purpose, are applied to the conductive base to form the first, charge carrier-producing layer, which is 0.005–5 μm, preferably 0.08–1.2 μm, thick when dry. The dispersion used for casting this layer is prepared by tumbling about 20–85% by weight, based on the dye content of the dispersion, of one or more dyes typical of the novel recording medium, and 80–15% by weight of a suitable binder. An adhesive layer about 0.05–5 μm, preferably 0.1–0.8 μm, thick may be located between the base and the first layer.

The transparent second layer, 0.8–90 μm, preferably 2–40 μm, thick, is located on top of the first layer, and is also cast from a solution. It is composed of from 30 to 90% by weight of one or more charge carrier-transporting compounds, from 65 to 5% by weight of one or more binders conventionally used for this purpose, and from 0.1 to 10% by weight of additives which improve the mechanical properties, with or without up to 5% by weight of sensitizers or activators. The layer is cast from a low-boiling solvent.

A barrier layer about 0.05 to 1.5 μm, preferably 0.1 to 0.5 μm, thick may be located between the first and second layers, and depending on the intended use of the electrophotographic recording medium, it may be appropriate to apply an inactive, protective top layer to the charge carrier-transporting layer.

Suitable electrically conductive bases are aluminum foils, aluminum sheet or nickel sheet, or plastic films, preferably polyester films, coated by vapor deposition with aluminum, tin, lead, bismuth or a similar metal. The choice is influenced by the field of use of the electrophotographic element.

The barrier layer between the conductive base and the first layer, or between the latter and the second layer, usually consists of a metal oxide, eg. aluminum oxide, or a polymer, eg. a polyamide, polyvinyl alcohol, a polyacrylate or polystyrene, or a similar system. However, the binder of the first layer may also be used as the barrier layer material, if desired.

Polyacrylates, polymethacrylates, polyesters, polyphthalates, polyvinyl chlorides, styrene/maleic acid copolymers, epoxides and other conventional resins are suitable binders for accommodating the dyes according to the invention in the production of the charge carrier-producing layer which forms part of the novel electrophotographic recording medium. Suitable binders for the second, charge carrier-transporting layer are in particular polyvinyl chloride, polyester resins, polyacetal resins, polycarbonates, polystyrene and polyurethanes, ie. those binders which are known by the skilled worker to possess special electrical properties. Thus, silicone resins, polyvinyl acetate, chlorinated rubber, cellulose esters, ethylcellulose and the like may also be used. Suitable charge carrier-transporting compounds present in this layer are those which do not adversely affect the transparency to visible light, for example (a) low molecular weight compounds, in particular heterocyclic compounds, eg. pyrazoline derivatives, oxazoles, oxadiazoles, phenylhydrazones, imidazoles, triphenylamine derivatives, carbazole derivatives and pyrene derivatives, and other, condensed aromatic compounds, and (b) polymeric materials, for example poly(N-vinylcarbazole), and copolymers of carbazole and styrene and/or vinyl acetate and/or vinyl chloride. It is not clear what permutations this covers.)

Of the polymers, poly-(N-vinylcarbazole) is particularly suitable.

The novel electrophotographic recording media may also contain further constituents to improve their mechanical properties. Thus, wetting agents, for example silicone oils, can improve the surface quality. Moreover, sensitizers or activators may additionally be incorporated into the upper, second layer. Examples of conventional sensitizers, which may be dispersed, are triphenylmethane dyes, xanthone dyes and soluble perylene derivatives, eg. perylenetetracarboxylic acid esters. Compounds having a high electron affinity, for example nitro compounds, such as 2,4,7-trinitrofluoren-9-one may be used as activators.

The novel electrophotographic recording medium contains very photosensitive photosemiconductive double layers which possess high mechanical stability and can run continuously, for example attached to the surface of a cylindrical drum or as an endless belt, without exhibiting signs of wear. Accordingly, they are very useful for reproduction work, for example as copying layers or electrophotographic offset printing plates.

The Examples which follow illustrate the invention.

EXAMPLES 1 AND 2

5 g of the dye 1 (n=0)

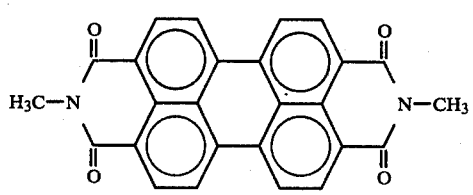

prepared from perylene-3,4,9,10-tetracarboxylic acid and methylamine, and 5 g of the dye 2 (n=5-6)

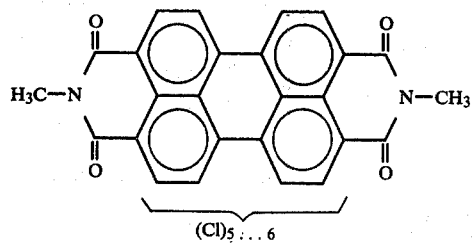

prepared as described in German Laid-Open Application DOS No. 2,139,690, were mixed with 3 g of a copolymer of vinyl chloride, acrylic acid and a maleic acid diester, and 25 g of tetrahydrofuran, and the mixture was tumbled on a roller-stand for 12 hours. Thereafter, 75 g of tetrahydrofuran and 25 g of toluene were added, and the mixture was homogenized on the roller-stand for one hour.

This dispersion was then applied with a knife-coater to a base of 175 μm thick, electrically conductive, untreated aluminum sheet. A 30 μm casting slot was used, and the speed of the knife-coater was 260 mm/minute. After the solvent had been allowed to evaporate off in the air and drying had been effected for 30 minutes at 90° C., a 0.8–0.9 μm thick dry layer resulted.

A solution of 47.75 g of poly-(N-vinylcarbazole), 5.2 g of dihexyl phthalate and 5.75 g of a polycarbonate of melting point 220°–230° C. in a mixture of 287.5 g of tetrahydrofuran and 74.25 g of toluene was applied to the first, high-hiding layer (b) in each case. A casting slot of 140 μm was used, and the speed of the knife-coater was 260 mm/minute. After the solvent had been allowed to evaporate off in the air and drying had been effected for 30 minutes at 90° C., an 8–9 μm thick dry layer was obtained as the second layer (c).

TEST METHODS

The electrophotographic element prepared in this manner was subjected to −7.40 kV with a corona wire at a distance of 10 mm above the surface of the layer. After a loading period of 20 seconds, the maximum surface potential achieved was determined in volts. The surface potential of dye 1 was taken as 100%, and the surface potential of dye 2 was expressed as a percentage of that of dye 1. After a further 20 seconds in the dark, the decrease in potential as a percentage of the maximum potential was determined. The electrophotographic element was then exposed for one second to light from a 150 watt xenon lamp, and the light-induced decrease in potential, as a percentage of the potential after it had decreased in the dark, was determined.

In addition, the maximum rate of decrease in the field strength was determined at 10 mm intervals over the charged surface, on exposure to light.

In Table (1), the results of the measurements are compared with the degree of chlorine-substitution expressed as a percentage of the maximum possible substitution.

TABLE 1

| Dye | Degree of chlorine substitution in % | Number of chlorine atoms (n) | Maximum surface potential as a % of 1 | Light-induced decrease in potential in % | Maximum rate of decrease in the field strength per second [kV/m · s] |
| --- | --- | --- | --- | --- | --- |
| 1 | 0 | 0 | 100 | 78 | 270 |
| 2 | 66 | 5...6 | 57 | 95 | 425 |

The results given in Table 1 show that a degree of halogen-substitution within the range according to the invention gives an improvement in the photosensitivity.

EXAMPLES 3 TO 6

Using a procedure very similar to that of Examples 1 and 2, an electrophotographic recording medium containing dye 3 (m=0),

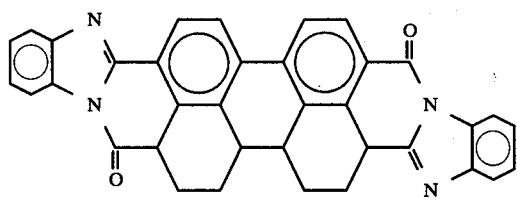

prepared from perylene-3,4,9,10-tetracarboxylic acid and orthophenylenediamine, and electrophotographic recording media containing dye 4 (m=5-6)

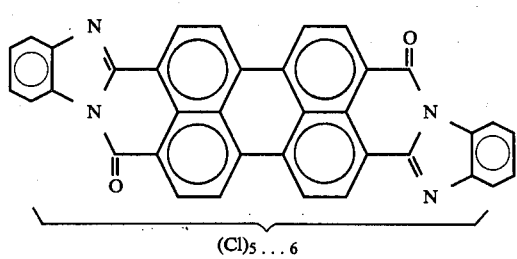

dye 5 (m=9)

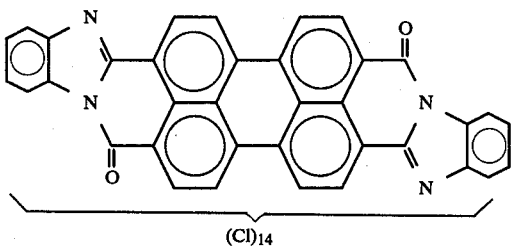

and dye 6 (m=14)

prepared by chlorinating dye 1 in chlorosulfonic acid, using iodine as a catalyst, were produced and tested. The results of the measurements are summarized in Table 2, in the same way as in Table 1, and the maximum surface potential is again expressed as a percentage of that of dye 1.

TABLE 2

| Dye | Degree of chlorine substitution in % | Number of chlorine atoms (m) | Maximum surface potential as a % of 1 | Light-induced decrease in potential in % | Maximum rate of decrease in the field strength per second [kV/m · s] |
| --- | --- | --- | --- | --- | --- |
| 3 | 0 | 0 | 67 | 84 | 325 |
| 4 | 34 | 5-6 | 127 | 68 | 230 |
| 5 | 56 | 9 | 75 | 99.5 | 940 |
| 6 | 87.5 | 14 | 59 | 5 | 50 |

In this case again, the dye with a degree of halogen substitution within the range according to the invention possesses the best electrophotographic properties.

We claim:

1. An electrophotographic recording medium which consists essential of
   (a) an electrically conductive base,
   (b) a first layer containing a charge carrier-producing dye of the formula (I) or (II)

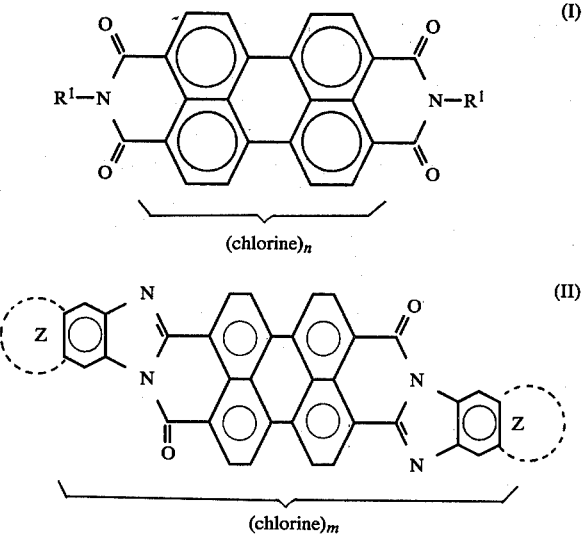

where $R^1$ is hydrogen, alkyl, aralkyl, aryl or alkylaryl, and Z, where relevant, is a fused aromatic system, and
   (c) a second layer which is substantially transparent to actinic light and is compsed of insulating organic materials containing at least one compound which is charge carrier-transporting when exposed to light, wherein the chlorine substitution n or m, based on the aromatic skeleton of the formula (I) or (II), is from 45 to 75% of the maximum possible.

2. The electrophotographic recording medium of claim 1, wherein the charge carrier-producing dye of the formula (I) is a chlorinated perylene-3,4,9,10-tetracarboxylic acid N,N'-dimethyldiimide with a degree of chlorination of the aromatic skeleton of about 66% of the maximum possible chlorination.

3. The electrophotographic recording medium of claim 1, wherein the charge carrier-producing dye of the formula (II) is a chlorinated perylene-3,4,9,10-tetracarboxylic acid bis-benzimidazole with a degree of chlorination of the aromatic skeleton of about 56% of the maximum possible chlorination.

4. The electrophotographic recording medium of claim 1, wherein in the second layer, which is substantially transparent to actinic light, the compound which is charge carrier-transporting when exposed to light is poly-(N-vinylcarbazole).

5. A process for the production of an electrophotographic recording medium as defined in claim 1, wherein there is applied to an electrically conductive base a dispersion containing a charge carrier-producing dye, with or without an insulating organic binder, to give a 0.005–5 μm thick dry layer, following which a solution of an insulating organic material which is charge carrier-transporting when exposed to light, with or without other insulating organic materials which are completely compatible with one another in solution and in the dry film, is applied to the dry layer thus obtained, to form a second layer which is 2–40 μm thick when dry.

* * * * *

UNITED STATES PATENT AND TRADEMARK OFFICE
CERTIFICATE OF CORRECTION

PATENT NO. : 4,429,029

DATED : January 31, 1984

INVENTOR(S) : Gerhard HOFFMANN et al.

It is certified that error appears in the above-identified patent and that said Letters Patent is hereby corrected as shown below:

Claim 1, line 2, column 9, delete "essential"

and substitute --essentially--.

Signed and Sealed this

Thirty-first Day of July 1984

[SEAL]

Attest:

GERALD J. MOSSINGHOFF

Attesting Officer

Commissioner of Patents and Trademarks